(No Model.)
H. C. JOHNSON.
APPARATUS FOR COOLING BUILDINGS, &c.
No. 316,976. Patented May 5, 1885.
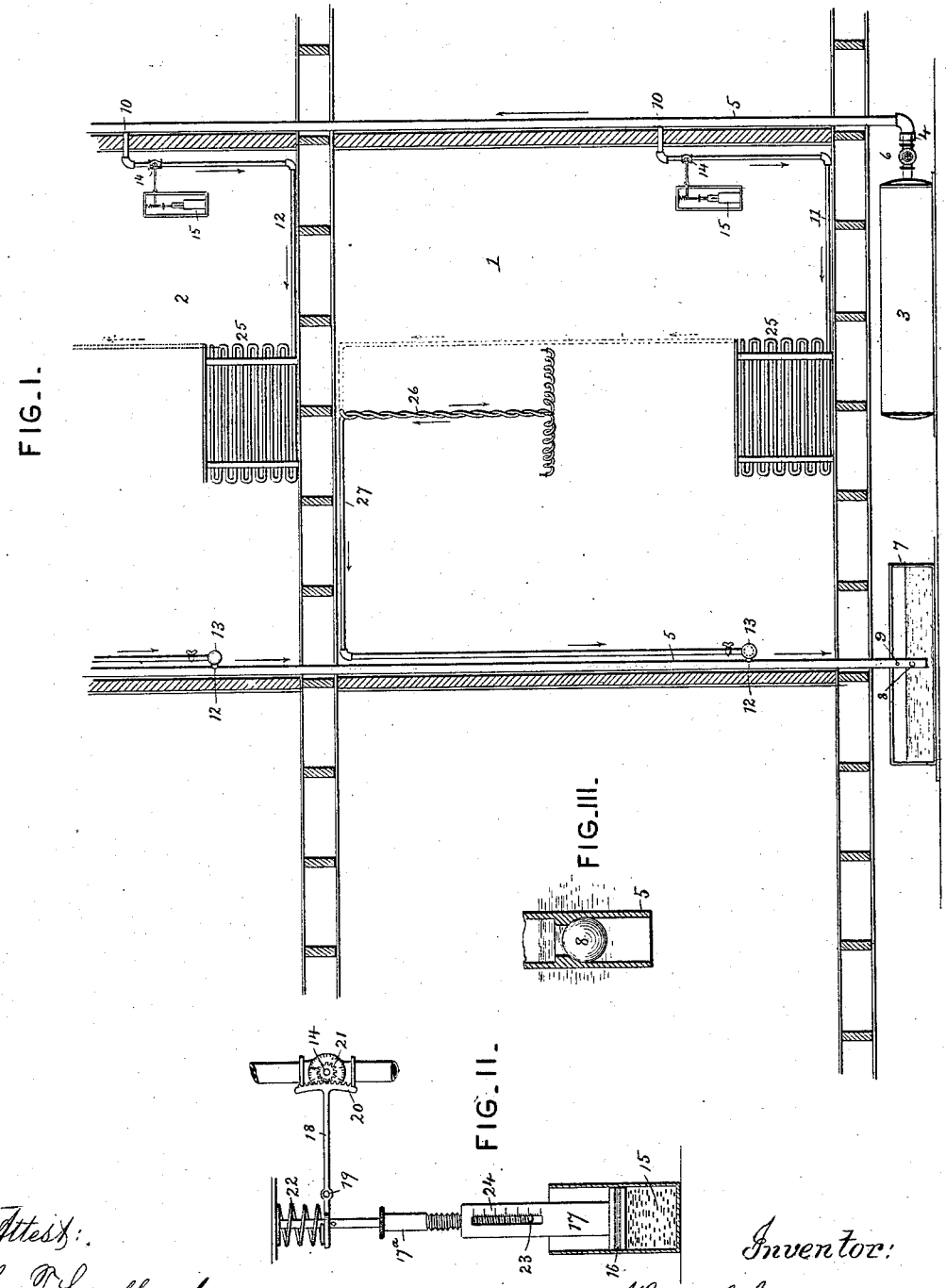

UNITED STATES PATENT OFFICE.

HENRY C. JOHNSON, OF MEADVILLE, PENNSYLVANIA.

APPARATUS FOR COOLING BUILDINGS, &c.

SPECIFICATION forming part of Letters Patent No. 316,976, dated May 5, 1885.

Application filed April 6, 1885. (No model.)

*To all whom it may concern:*

Be it known that I, HENRY CLAY JOHNSON, a citizen of the United States, residing at Meadville, in the county of Crawford and State of Pennsylvania, have invented a new and useful Improvement in Apparatus for Cooling Buildings, of which the following is a specification.

My invention relates to an apparatus for cooling dwelling-houses, store-houses, grain-elevators, public buildings, churches, hospitals, and all buildings for public assemblages, and is applicable, also, in some of its parts to mortuary boxes.

The apparatus consists, essentially, of one or more receivers containing anhydrous ammonia in liquid form, one or more tanks containing water, by which the expanded gas is taken up and retained for future use, a main conduit leading from the receiver to the water-tank, and branch conduits affording the necessary extent of cooling-surface in the various apartments to be cooled, and provided with separate regulating-valves, to control the heat in such apartments independently. Thermal regulators are provided in the several apartments, which may be set to control the temperature at any degree required. The outlet from the conducting-pipe to the water-tank is provided with a check-valve, to prevent the influx of water to the pipe, and with an air-aperture above the surface of the water, to prevent the condensation of the gas producing an instantaneous vacuum within the pipe. The holders or receivers for the condensed anhydrous ammonia may be located in separate apartments or in the apartments to be cooled, as preferred. The separate cooling-conduits for the several apartments may be arranged within cornices around the ceilings, or form ornamental cornices; or they may be arranged in connection with the chandeliers or to imitate ornamental chandeliers; or they may be arranged after the manner of coiled radiators now in common use for heating buildings.

In the accompanying drawings, Figure I is a vertical section of portions of a building supplied with my cooling appliances. Fig. II is a section on a larger scale of the thermal regulator. Fig. III is a section of a gas-receiving water-tank, showing the check-valve to prevent the influx of water.

1 2 represent different apartments of a building of any kind to be cooled by my apparatus. A removable receiver or holder is shown at 3, for containing anhydrous ammonia compressed into liquid form. The said receiver communicates by a hose, 4, with a main conduit, 5, under control of a valve, 6, which I prefer to provide with a dial, as shown, for regulating the discharge of gas. The main conduit 5 extends throughout the building under any desirable arrangement, and terminates in a tank, 7, containing water to take up the spent ammoniacal gas, a check-valve, 8, being provided at the outlet of the conduit 5, closing inwardly toward the pipe, so as to prevent the influx of water. I also provide an aperture, 9, in the pipe near its discharge end above the level of the water, to modify the effect of the vacuum, as above stated, and as I have more particularly described and claimed in another application of even date herewith. The several apartments 1 2, &c., are cooled by separate branch conduits 11 12, connecting with the main conduit 5 by an inlet at 10 and by an outlet at 12, provided with a check-valve, 13, to prevent the influx of water. Near the inlet 10 the branch conduits 11 12, &c., are provided with thermal regulators, to accurately control the passage of the gas and enable the cooling effect to be maintained in the several apartments independently, as desired, so as to keep the temperature of the several apartments at any required point. A thermal regulator suitable for this purpose is shown on a larger scale in Fig. II. It consists, essentially, of a dial-valve, 14, actuated by the expansion of mercury in a cylinder, 15, through the medium of a piston, 16, and a variable rod, 17, and a lever, 18, fulcrumed at 19, and carrying a cogged segment, 20, gearing with a pinion, 21, on the shaft or pintle of the dial-valve 14. The shorter end of the lever 18 is forced upward by the expansion of mercury in the cylinder 15, so as to close the valve, and on the contraction of the mercury it is forced downward by a spring, 22, so as to keep the piston 16 constantly in contact with the mercury in the cylinder and prevent any lost motion. Now, in order to arrange for regulating the temperature at any desired point, the piston-rod 17 is made with a supplemental rod, 17ª, screwed into the hollow rod 17, so as to form a piston-rod adjustable in length and provided with an index, 23, on one member, working over a thermometer-scale, 24, on the other member, so that by lengthening or shortening the compound piston-rod 17 17ª the regulating effect of the thermal valve may be controlled as desired.

I have shown in Fig. I, for the purposes of illustration, the branch cooling-coils 11 12 in various forms, which will suffice to suggest a great variety of other modes in which they may be applied—as, for example, a coil similar to an ordinary radiator is shown at 25, and an imitation chandelier at 26, forming part of the cooling-coil, while at 27 the pipe is shown passing along the ceiling, where it may be concealed in a cornice. The vertical portions of both the main conduit 5 and the branch conduits 11 12, &c., may of course be concealed within the walls, and any of the horizontal portions between the floors and ceilings, after the manner of gas-pipes, when desirable.

Having thus described my invention, the following is what I claim as new therein and desire to secure by Letters Patent:

1. A cooling apparatus for buildings, consisting of one or more receivers containing anhydrous ammonia in liquid form, one or more tanks containing water, by which the gas is taken up and condensed, so as to be subsequently evolved and recondensed by pressure for future use, a pipe or other suitable conduit leading from the receiver to the water-tank, and one or more branch pipes or other cooling-conduits located in the several apartments to be cooled, and connected with the main conduit through separate regulating-valves, substantially as and for the purposes herein set forth.

2. A cooling apparatus for buildings, consisting of one or more receivers containing anhydrous ammonia in liquid form, one or more tanks containing water, by which the ammonia-gas is taken up and condensed, so as to be subsequently evolved and recondensed by pressure for future use, a pipe or other suitable conduit leading from the receiver to the water-tank, one or more branch pipes or other cooling-conduits connected with the conducting-pipe above named and located in the several apartments to be cooled, separate regulating-valves for controlling the passage of the cooling-gas through the several apartments independently, and thermal regulators acting upon the said regulating-valves to automatically control the heat of the several apartments, as described.

3. In combination with a cooling apparatus for buildings, substantially as herein set forth, the automatic thermal regulator herein described, consisting of a cylinder containing mercury or other liquid expansible by heat, a piston working therein, a rod connecting said piston with the valve of the conduit to be regulated, adjustable in length and provided with a scale, to indicate the temperature to which the automatic thermal regulator is adjusted.

4. A cooling apparatus for buildings, consisting of one or more receivers containing anhydrous ammonia in liquid form, one or more tanks containing water, by which the ammonia-gas is taken up and condensed, to be subsequently evolved and recondensed by pressure for future use, a pipe or other suitable conduit leading from the receiver to the water-tank, a check-valve and relief-opening, to prevent the influx of water from the tank to the conduit, and branch pipes or other cooling-conduits located in the several apartments to be cooled, and connected with the main conduit through separate regulating-valves, all substantially as herein shown and described.

HENRY C. JOHNSON.

Witnesses:
HENRY A. LOCKWOOD,
ALBERT MILLER.